United States Patent [19]

Silver et al.

[11] Patent Number: 5,372,847
[45] Date of Patent: Dec. 13, 1994

[54] AMMONIA RELEASE METHOD FOR DEPOSITING METAL OXIDES

[75] Inventors: Gary L. Silver, Centerville; Frank S. Martin, Farmersville, both of Ohio

[73] Assignee: The United States of America as represented by the United States Department of Energy, Washington, D.C.

[21] Appl. No.: 121,483

[22] Filed: Sep. 16, 1993

[51] Int. Cl.$^5$ ................................................ B05D 3/02
[52] U.S. Cl. ...................... 427/226; 427/350; 427/372.2; 427/373; 427/383.5; 427/404; 427/299
[58] Field of Search ............... 427/226, 350, 372.2, 427/373, 383.5, 404, 299

[56] References Cited

U.S. PATENT DOCUMENTS

| | | | |
|---|---|---|---|
| 2,726,144 | 12/1955 | Wallis et al. | 23/183 |
| 3,127,241 | 3/1964 | Periard et al. | 23/201 |
| 3,248,251 | 4/1966 | Allen | 106/286 |
| 3,875,296 | 4/1975 | Brubaker | 423/592 |
| 3,887,740 | 6/1975 | Foster et al. | 428/116 |
| 3,967,958 | 7/1976 | Coffield et al. | 75/103 |
| 3,979,265 | 10/1976 | Fonseca | 204/105 R |
| 4,065,300 | 12/1977 | Poarch | 75/117 |
| 4,213,792 | 7/1980 | Marianeschi et al. | 106/286.6 |
| 4,228,204 | 10/1980 | Matuura | 427/372.2 |
| 4,400,326 | 8/1983 | Daudt et al. | 260/429 R |
| 4,498,936 | 2/1985 | Haselkorn | 148/6.5 R |
| 4,572,797 | 2/1986 | Silver | 252/631 |
| 4,693,916 | 9/1987 | Nagayama et al. | 427/397.7 |

OTHER PUBLICATIONS

"British Advance Superconducting Thin Films," *Research and Development*, Nov. 1987, p. 45.
"Thin-Film Method," *Nature*, vol. 332, Mar. 31, 1988, p. 385.
R. Pool, "Turning Down the Heat on Thin Films," *Science*, vol. 241, Jul. 8, 1988, pp. 163–164.

*Primary Examiner*—Shrive Beck
*Assistant Examiner*—Brian K. Talbot
*Attorney, Agent, or Firm*—Russell D. Elliott; James H. Chafin; William R. Moser

[57] ABSTRACT

A method of depositing metal oxides on substrates which is indifferent to the electrochemical properties of the substrates and which comprises forming ammine complexes containing metal ions and thereafter effecting removal of ammonia from the ammine complexes so as to permit slow precipitation and deposition of metal oxide on the substrates.

18 Claims, 1 Drawing Sheet

AMMONIA RELEASE METHOD FOR DEPOSITING METAL OXIDES

GOVERNMENT RIGHTS

The United States Government has rights in this invention pursuant to Contract No. DE-AC04-88DP43495 between the U.S. Department of Energy (DOE) and the EG&G Mound Applied Technologies.

BACKGROUND OF THE INVENTION

1. FIELD OF INVENTION

This invention pertains to plating, and more particularly to depositing metal oxides by a method involving release of ammonia from ammine complexes.

2. Description of the Related Art

Plating technology is widely used in modern society. Typical examples include gold-plated jewelry, silver-plated dinnerware, chrome-plated automobile parts, copper-plated pots, and zinc-plated steel. Plating is also used for a variety of processes such as corrosion resistance, surface hardening, and appearance. As described in detail below, plating is widely thought to have present and future applications in the use of high-temperature superconducting materials. In addition to plating, many other techniques for coating surfaces are also known, including sputtering and anodizing.

While many methods are known for plating with electrically conductive substances, such as gold and silver, very few methods are known for plating or depositing substances, such as metal oxides, which are nonconductive under plating conditions. Using the traditional plating techniques commonly used today, parts to be plated must be electrically conductive, or they must be able to withstand high temperatures. Most contemporary plating technology is therefore limited with regard to the types of substances that can be successfully used as plates or substrates.

For most of this century, the flow of electric current without resistance was thought to be confined to metals cooled to temperatures near absolute zero. Such resistance-free flow of electricity, termed "superconductivity", is presently conceived as promising civilization significant technological advances. A finding of great significance is the recent discovery of substances that become superconducting at temperatures much higher than earlier thought possible.

During the last decade, it was discovered in Europe that certain metal oxides, or oxide compositions, become superconducting at temperatures substantially above absolute zero. These substances exhibit superconductivity when cooled to temperatures above the boiling point of nitrogen. Since liquid nitrogen is available in bulk at prices not much different from those of common liquids, such as milk, superconducting substances promise to have household applications. Even though the temperatures at which such substances operate are very cold by the standards of everyday life, these oxides are called "high-temperature superconductors." Since the original European discovery, many new high-temperature superconductors have been discovered. Most of them are based on metal oxides or on mixtures of metal oxides.

In order to take advantage of the new superconducting oxides, it will be necessary to obtain them in customary shapes of electrical conduits: wires, bars, and cables, for example. Metal oxides, however, are not usually flexible; they are typically brittle, crumbly, ceramic-like substances. This fact presents technical problems, since electronics often depend on the flexible nature, of wires for such purposes as windings and odd-shaped conductors to transport electricity from one location to another in complicated electrical machinery.

The problem of using brittle ceramics for the superconduction of electricity has many possible solutions. One of these is the depositing of superconductors on the surfaces of nonconducting substrates. Deposition of superconducting oxides in the form of continuous deposits of thin films in patterns that mimic complicated wiring diagrams will solve problems otherwise associated with the brittleness of the ceramics and will significantly advance the practical application of superconducting substances.

The importance of thin-film technology to application of superconductivity is summarized in *Science*, 241 (1988) 163. According to the article, superconducting thin films will be essential to the practical application of superconductivity in microelectronics. Problems now associated with techniques for depositing metal oxides, however, are significant. For example, some existing techniques for deposition of thin films of superconducting oxides require that the substrate onto which the metal oxide is to be plated be heated to high temperatures; in some cases, those temperatures are high enough to cause degradation of the substrate and superconducting oxide or reaction of the metal oxides with the substrate. In addition, high-temperature processes can also cause rough surfaces or cracks in the metal oxide film, which may render otherwise superconducting circuit designs useless. Moreover, the films deposited by existing techniques may be very thin, and thus have limited current-carrying; capacity. For these reasons, as well as many others, substantial improvements in deposition technology for metal oxides are greatly needed.

The phenomenon of precipitation from homogeneous solution has been known for many years. In this phenomenon, precipitate is formed in solution by a slow chemical reaction. Precipitates formed under these conditions are apt to be rather pure, because precipitation from homogeneous solution minimizes the coprecipitation of undesired substances. Precipitation from homogeneous solution is used, for example, in gravimetric quantitative chemical analysis, where the weight of a dried, highly pure precipitate is the critical factor in ensuring the accuracy of the analysis. Some precipitates that are formed slowly, as in the homogeneous precipitation process, can be deposited directly on some inert substances, such as glass. In the present invention, the slowly-formed precipitates of metal hydroxides do not occur as suspensions of solids, as in usual precipitation processes, but rather form coatings (thin films) on substrates such as glass.

It is well-known that many metals form ammine complexes in solution. These complexes are written as $M(NH_3)_n$, where "n" is the number of ammonia molecules in the complex. Typically, "n" is an integer, often 2, 4, or 6. The complex will typically be charged, although in the above representation, the charge was omitted. A typical ammine complex is the blue species formed by copper ions and ammonia: $Cu(NH_3)_4^{2+}$.

Complexes, including ammine complexes, "stabilize" metal ions and can be used to prevent their precipitation. Thus, a metal cation that is not complexed will form a precipitate upon coming into contact with a precipitate-forming anion. In the presence of a complexing agent, however, the precipitate-forming anion can be prevented from precipitating the metal. Both precipitate-forming anions and complexing agents compete for the metal ions. If one of these species is more successful than the other in reacting with the metal ions, it will dominate the reaction, thus either causing or preventing precipitation. Calculations involving solubility products and the stability constants of the metal ammine complexes can be used to delineate (in an approximate manner) the range of metal and hydroxide ion concentrations that are appropriate for the process of the present invention.

BRIEF SUMMARY OF THE INVENTION

Accordingly, it is an object of the present invention to provide a method for depositing metal oxides on glass surfaces by precipitation from homogeneous solution.

It is another object of the invention to achieve such deposition by the slow, progressive removal of ammonia from solutions of metal salts containing hydroxide ions or other anions under conditions which permit the precipitation of the metal as it is removed from its ammine complexes.

It is yet another object of the invention to achieve deposition of a plate of copper oxide and/or copper hydroxide from copper, which is the dissolved, complexed metal.

It is yet another object of the invention to apply the process to generate silver oxide and/or silver hydroxide plate from silver which is the dissolved, complexed metal. This object further includes possible deposition of silver nitride, since this compound is sometimes said to form in ammoniacal solutions of silver nitrate.

It is yet another object of the invention to achieve plating of metal oxides on inert substrates other than glass.

It is yet another object of the present invention to form films of metal oxides on inert substances by a method which includes deposition of films in an aqueous environment, and thereafter dehydrating the films to form dry plates of metal oxides by methods such as physical and/or chemical desiccation, in air or in a vacuum, or by application of heat.

It is yet another object of the present invention to achieve deposition of metal oxides in which the metal used is a member of that group of metals that form ammine complexes in aqueous solution, which group includes but is not restricted to copper, zinc, nickel, and silver.

It is yet another object of the present invention to achieve plating which is preferentially obtained on surfaces particularly treated to make them amenable to plating, such treatment including, but not being restricted to, sand blasting, scratching, or swabbing with a corrosive chemical.

It is yet another object of the present invention to sequentially deposit plates of metal oxides containing different species of metals.

It is yet another object of the present invention to deposit metal oxides using a method that can vary the thickness of the deposit depending upon the length of time the operation is continued, by varying the total concentration of dissolved metal available to be plated, or by successive application of individual treatments.

It is yet another object of the present invention to employ a precipitating ion which is either hydroxide or some other anion that may be used analogously for deposition according to the method of this invention.

It is yet another object of the present invention to deposit metal oxides using nitrogen gas and ammonia water alone, without adding ancillary hydroxide ions from another hydroxide compound.

It is yet another object of the present invention to deposit metal oxides by removing ammonia from solution containing ammine complexes by means of heat. In this modification of the invention, ammonia is removed by heating a solution of ammonia containing a metal salt, with or without hydroxide ions from another alkali salt.

It is yet another object of the present invention to deposit metal oxides by removing ammonia from a solution containing ammine complexes by means of any physical method such as heating or blowing gas bubbles through the solution.

It is yet another object of the present invention to achieve said ammonia removal by chemical means instead of by physical means, including all common methods of ammonia removal known to those skilled in the art of chemistry; for example, ammonia removal by reaction of the ammonia with formaldehyde to form hexamethylenetetrammine or reaction with an ancillary metal ion introduced to remove the ammonia molecules from the ammine complexes containing the metal ions to be plated.

Upon further study of the specification and appended claims, further objects and advantages of this invention will become apparent to those skilled in the art.

These objects have been obtained by providing a method of depositing metal oxides which comprises:

Combining metal ions in aqueous solution with aqueous ammonia in an aqueous reaction environment under appropriate conditions so as to form ammine complexes, followed by removing ammonia from said ammine complexes thereby effecting the slow liberation of metal ions into said aqueous reaction environment, and finally allowing said liberated metal ions to slowly form a precipitate which adheres to at least one substrate placed within the reaction vessel and in contact with said aqueous reaction environment.

This method has been carried out in an apparatus comprising:

a generally cylindrical tube,
water within said tube,
a reservoir in operative association with the top of said tube and said water wherein gas may be allowed to accumulate,
a means for introducing metal ions in aqueous solution into said water,
a means for introducing aqueous ammonia into said water, and a means for introducing precipitants into said water,
a means for introducing gas into said water in the region of the bottom portion of the cylindrical tube,
a means of a gas dispersion device through which gas to be introduced into the reaction vessel is passed such that fine bubbles are formed in said water, and
a means for placing a substrate or substrates onto which metal oxide, metal hydroxide, or both, is to be deposited into physical association with said water, wherein the diameter and length of said cylindrical tube and reservoir are selected, and the physical and chemical conditions within the tube, including the presence or absence of hydroxide ions, concentration of reactants, and temperature, may be controlled such that the rates of ammonia release, precipitation of metal ions, and adsorption of metal ion precipitate onto substrates may be regulated so as to achieve the desired deposition result.

DETAILED DISCUSSION

Figure 1:
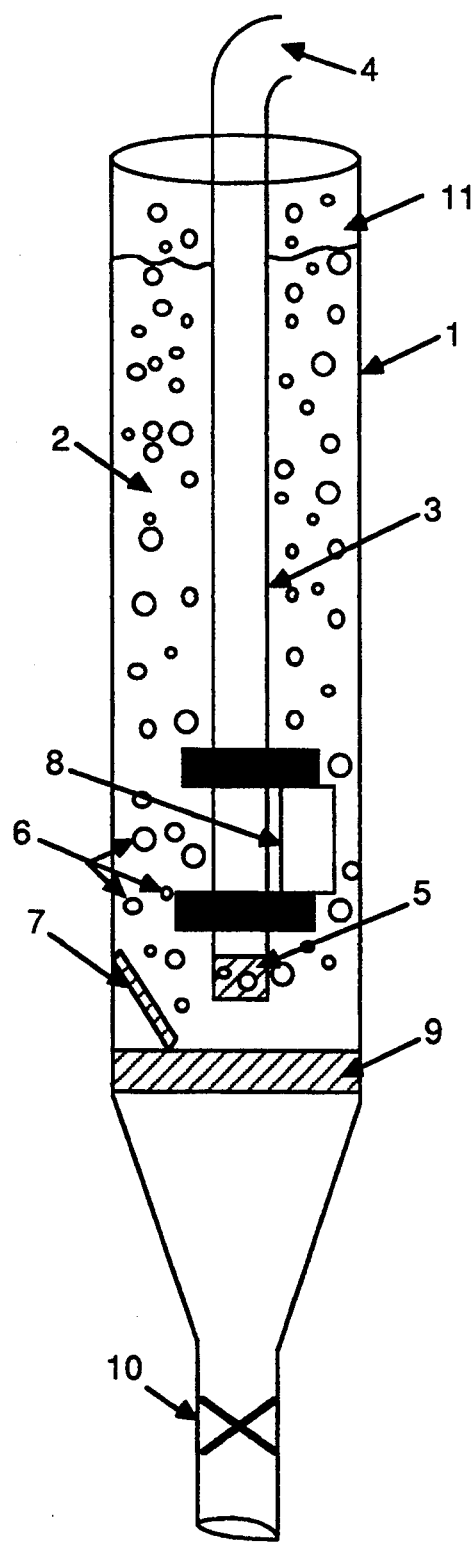
FIG. 1 illustrates a preferred apparatus for performance of the process of this invention.

The invention disclosed herein is a process for depositing metal oxides by slowly inducing the precipitation of metal hydroxide, oxide, or both. As described in detail, below, a metal oxide plate may be achieved by first depositing metal hydroxide which is then converted to oxide, in situ.

Very slow removal of a complexing agent from solution allows a metal hydroxide to form under very slow, controlled conditions. For example, copper oxide may be deposited from a solution containing complexed copper by slowly removing the complexing agent in the presence of hydroxide ions from a strong base such as potassium hydroxide. In this case, a suitable complexing agent is ammonia, well-known as a volatile substance.

In the presence of ammonia, copper ions form ammine complexes:

$$Cu^{2+} + 4NH_3 = Cu(NH_3)_4^{2+} \quad (1)$$

Due to its volatility, ammonia can be swept out of water by blowing an inert gas through the water. If an inert gas is blown through a copper and ammonia-containing solution, Equation (1) is reversed as the ammonia is slowly removed and blown away by the gas stream.

$$Cu(NH_3)_4^{2+} = Cu^{2+} + 4NH_3 \quad (2)$$

When the copper is freed from the ammine complex, it is available to form a precipitate with precipitate-forming anions such as hydroxide.

$$Cu^{2+} + 2OH^- = Cu(OH)_2 \quad (3)$$

Thus, the process of the present invention works by the reaction $$Cu(NH_3)_4^{2+} + 2OH^- = Cu(OH)_2 + 4NH_3 \quad (4)$$

which is slowly induced by a stream of inert gas, as bubbles, being passed through the solution. The ammonia blows away as the gas bubbles leave the solution. In the preferred embodiment, nitrogen is used as the inert gas, but other inert gases should serve just as well. Deposition is frequently observed to begin at the flit that disperses the inlet gas into small bubbles. Presumably, this is because ammonia is depleted first at the site of gas entry. This makes it desirable to clean the frit occasionally, as by immersion in acid. The acid wash, however, must be thoroughly rinsed away, or else residual acid will neutralize the hydroxide ions that are necessary for precipitation.

The copper-ammine complex system described above is representative of a wide range of metal-ammine complex systems which exhibit similar behaviors with respect to the method of the present invention. The ammonia-release method described herein is not limited solely to depositing copper oxide and copper hydroxide but may be extended to apply to depositing oxides and/or hydroxides of any of the metals capable of forming ammine complexes. Metals suited to the process of this invention include, but are not limited to, copper, silver, chromium, cobalt, nickel, ruthenium, rhodium, palladium, zinc, cadmium, platinum and iridium. Combinations of ammine complexes containing different metallic species may likewise be utilized in the method and may result in the formation of deposits containing mixtures of metal ions. The carrier gas (analogous to the nitrogen discussed above in connection with the copper-ammine complex system) for any application of the method of the present invention may be any gas which is chemically inert with respect to the deposition reactions.

The release of ammonia from the ammine complexes need not be achieved only by means of a carrier gas. Ammonia removal may also be accomplished by other physical means, such as by heating, or by any chemical means which will effect decomposition of the ammine complexes and free metal ions for deposition.

The method of the present invention provides for the slow liberation of metal ions thereby making them available for precipitation. The slow character of the precipitate formation permits deposition of the precipitate in the form of a deposit on substrates placed in contact with the reaction solution. For purposes of the examples described below, glass substrates are typically selected, however, non-glass substrates which are inert with respect to the chemical reactions of the process may also be used.

The various objects, features, and intended advantages of the present invention will be more fully appreciated as the same becomes better understood and considered in conjunction with the accompanying drawing. The following description of FIG. 1 is intended to instruct, by way of illustration, the best mode perceived by the inventors for practicing the method of the invention in the context of plating copper oxide and/or copper hydroxide. From the information contained in the description of FIG. 1 and in the remainder of this specification, it will be apparent to those skilled in the art how to adapt the method for use in depositing metal oxides and hydroxides other than those of copper. This description is not intended to limit the claims to the copper ammine-complex system only. Furthermore, although hydroxide ions are described in the following description, it is here acknowledged that other anions may be equally suited for use in the process.

Referring to FIG. 1, an upright cylindrical glass column (1) approximately 20 inches long and 2 inches in diameter is partially filled with an ammonia-copper solution (2). The ammonia-copper solution (which, due to its chemical nature, contains ammine complexes) is prepared to specification as illustrated in the examples that follow. In the column is emplaced an inner glass tube (3) with a course frit (5) at an end disposed near the bottom of the column (1). Through the tube flows nitrogen gas (4). Bubbles (6) of nitrogen rise through the solution, carrying off ammonia vapor from the copper complex. In addition to the ammonia and copper contained in the solution (2), there is a specified amount of hydroxide ion, as illustrated in the examples that follow. As nitrogen gas bubbles through the column, and ammonia is carried off releasing copper ions formerly stabilized in ammine complexes, the hydroxide ions are allowed to react with copper, as set forth in Equation (4) above. Copper oxide, copper hydroxide, or both, are thereby allowed to form and deposit as an adherent film upon surfaces within the reaction environment. Various substrates (7,8) are placed in contact with the solution from which the oxide is allowed to precipitate. The process of the invention operates as a closed system in that no liquid is allowed to enter or exit the column during the period of a run. Nitrogen gas, however, is allowed to enter the system as described above, and nitrogen gas together with ammonia vapor is allowed to accumulate in the reservoir (11) within the glass cylinder, above the level of the liquid.

Unlike the copper hydroxide suspension that is formed, for example, when copper and potassium hydroxide solutions are rapidly mixed together, the copper hydroxide formed according to the method of this invention is not particulate. The copper hydroxide precipitate instead forms slowly and, rather than agglomerating and depositing on suspended particles, it is permitted to deposit on the glass and other substrates in contact with the solution.

The deposit formed is not whitish-blue cupric hydroxide, but rather black, or brownish-black, cupric oxide (hereinafter referred to as copper oxide). It is postulated that the copper oxide deposit is formed in the system either by direct deposition of copper oxide or by deposition of copper hydroxide which then spontaneously dehydrates:

$$Cu(OH)_2 = CuO + H_2O \qquad (5)$$

The precise mechanism for forming the deposit of copper oxide is not known in detail, however, the mechanism is incidental to the technology described in the invention disclosed here.

In a fashion similar to that just described for copper hydroxide and copper oxide, silver oxide or silver hydroxide may likewise be deposited. Furthermore, since silver nitride sometimes forms in ammoniacal solutions of silver nitrate, the method of this invention is potentially useful for depositing silver nitride on desired substrates.

Precipitates formed in water will probably retain water molecules. A method for further dehydration of the oxide coatings may therefore be desirable. Possible methods include desiccation in air over a desiccant such as phosphorous pentoxide, in a vacuum with or without a desiccant, or by the gentle application of heat in air or in a vacuum.

When depositing copper oxide, more dilute solutions of copper seem to deposit faster than do more concentrated solutions. It is postulated that this is due to the greater extent of dissociation of the copper are mine complex, as shown in Equation (2), in dilute solutions. A faster rate of nitrogen introduction will cause more rapid deposition, presumably because a rapid flow of gas will more readily sweep ammonia from the cylinder as compared with a slow flow. Demonstrations described in the examples herein have taken as long as eight days with a slow flow of nitrogen and as short as 24 hours with a rapid flow of nitrogen.

Various factors have been shown to alter or enhance the deposit achieved using the method of this invention. It has been demonstrated that deposition occurs preferentially on toughened surfaces bearing increased surface areas as compared with smooth, untreated substrates. Deposition loci may be preferentially selected by treating substrate surfaces using techniques including scratching, sandblasting or swabbing with a corrosive chemical.

In addition, the thickness of deposits may be altered by manipulating various of the conditions characterizing the deposition process. For example, as discussed above, low metal ion concentrations may cause deposition to occur more quickly than when higher concentrations are used. A thicker deposit can be generated under low concentration conditions if sufficient time for deposition is allowed. Successive applications may likewise yield a thicker deposit. Moreover, sequential depositions may be used to deposit mixtures containing oxides and/or hydroxides of different metals.

Without further elaboration, it is believed that those skilled in the art can, using the preceding description, utilize the present invention to its fullest extent. The following preferred embodiments, presented here as examples, are therefore to be construed as merely illustrative and not limitative of the remainder of the disclosure in any way whatsoever.

EXAMPLES

Except where otherwise indicated, the following examples of the method of this invention were carried out using the apparatus of FIG. 1. The apparatus has the dimensions summarized above. Unless noted to the contrary, all examples are carried out at ambient room temperature in the range of about 20–25 degrees Celsius. Deposits are dried in air and, where indicated in the examples, are examined by metallographic techniques. In some cases, actual data are presented which show results that have been obtained using the methods in the examples. These data are presented here for illustrative purposes, and are meant to be representative of results which can be obtained by following the steps described. Thicknesses, unless otherwise indicated, are measured in ten places, and average thicknesses noted in the following examples reflect the average of those ten measurements.

Example 1

In this example, 0.001 mole (about 0.056 g) of potassium hydroxide is weighed and dissolved into 600 ml of water. Then, 10 ml of concentrated ammonium hydroxide (ammonia water) is mixed into the solution. Then, 0.025 mole of copper sulfate pentahydrate (about 0.625 g) is dissolved into 275 ml of water and 5 ml of ammonium hydroxide is added. The copper solution is then poured into the potassium hydroxide solution. If a precipitate is observed, a few more milliliters of concentrated ammonia solution may be added to dissolve it. The mixture is then poured into the column shown in FIG. 1, and the nitrogen gas flow is started. (The volume of the column is about 950 ml. The column is about 18.25 inches long from the bottom of the frit to the top of the liquid, and about 2 inches in diameter.) Nitrogen is allowed to bubble through the liquid for a period of 5 days.

When the above steps were carried out, two glass slides placed in the column exhibited deposits of a black substance. Results obtained using the process of this example show that the average thickness of the deposit is $8 \times 10^{-4}$ inch, the range is $5 \times 10^{-4}$ to $14.7 \times 10^{-4}$ inch with a standard deviation of $2.68 \times 10^{-4}$ inch.

Example 2

In this example, two solutions are used; the first contains 300 ml of water, 0.11 g of potassium hydroxide (1 pellet of commercial, analytical-grade KOH), and 10 ml of concentrated ammonia solution. The second solution contains 100 ml of water, 0.64 g of copper sulfate, and 5 ml of concentrated ammonia solution. The liquids are mixed and transferred to the column. Glass slides are supported by the top of a glass weighing bottle positioned at the bottom of the cylinder. Nitrogen is then passed through the solution.

Results obtained using these steps showed that a black deposit formed both on the glass weighing bottle, and, to a lesser extent, on the glass slides. Thickness analyses were not performed.

Example 3

In this example, a glass slide is cleaned with sulfuric acid before immersion in the copper-ammonia solution. The glass slide is also scratched in a regular pattern of rectangles with a diamond stylus so that the slide can be broken into pieces that will fit into the surface analysis machine. The solution in the column is the same as in Example 2. Using this technique, the copper oxide deposit which results is very light; however, it will be observed that deposits form in the scratches first. This confirms that the nature of the surface of the substrate is important: rough surfaces with high surface area appear to attract deposits first. In addition, the glass frit at the bottom of the column, with its high surface area, also exhibits deposits before the glass surfaces of the slide in the interior of the column.

Results obtained using the method described in this example showed that a light coating of copper oxide was deposited. Thickness analyses of the resulting plate were not performed.

Example 4

In the next example, the surface of the glass slide is cleaned with concentrated HF solution. The surface of the glass slide is thus roughened and its surface area is increased. The glass slide is then rinsed with water and wiped dry. The deposition solution is the same as that used in Example 2. Care should be taken to ensure that the slide is adequately rinsed since residual fluorine may contaminate the resulting deposit.

X-ray photoelectron spectroscopy (XPS) analysis of a deposit obtained using the method of this example identified the deposit as copper oxide. Two slides were coated using this technique; the copper oxide plate had average depths of $8.9 \times 10^{-4}$ inch and $8.6 \times 10^{-4}$ inch, with ranges of $5.3-15.1 \times 10^{-4}$ and $5.3-13.5 \times 10^{-4}$ inches, respectively.

Example 5

In this example, silver nitrate is substituted for the copper salt. A solution of $0.6\underline{M}$ potassium hydroxide (33.7 g in 600 ml of water) is prepared and combined with 10 ml of concentrated ammonia solution. Another solution is prepared containing 275 ml of water with 0.02 mole (3.42 g) of silver nitrate and 5 ml of concentrated ammonia. The solutions are mixed and transferred into the column. Nitrogen is passed through the column for a period of seven days.

Results obtained using the method of this example showed that at the end of the seven-day period, the glass slide in the column was lightly coated with a black deposit. The average thickness of the coating was $2.9 \times 10^{-4}$ inch, and the range of thickness was $1.06-6.88 \times 10^{-4}$ inch with a standard deviation of $1.7 \times 10^{-4}$ inch. The X-ray emission lines from the deposit suggested the presence of sulfur, such as sulfate, in the deposit. It is believed that the source of the sulfur was an impurity introduced in handling.

Example 6

In this example, silver oxide is again deposited on the slide. The first solution is prepared containing 35.9 g of potassium hydroxide and 10 ml of concentrated ammonia solution and 600 ml of water, and the second solution is prepared containing 5.1 g of silver nitrate and 5 ml of concentrated ammonia solution and 275 ml of water. Upon mixing, a precipitate forms. The precipitate is dissolved by adding about 5 ml more of concentrated ammonia solution. The solution is then transferred to the column. Nitrogen gas is bubbled through the column for a period of eight days, after which the glass slide is removed and analyzed.

Results obtained using; the method of this example showed that the slide was coated with a black deposit of $5.6 \times 10^{-4}$ inch average thickness, with a range of thickness of $3.32-8.66 \times 10^{-4}$ inch, and a standard deviation of $1.97 \times 10^{-4}$ inch. The deposit was confirmed to be a deposit of silver in a positive oxidation state. It was probably $Ag_2O$, but could not be absolutely differentiated from AgO. Since the conditions of deposition in the example are not oxidizing, there is no reason to expect the silver to be in the divalent oxidation state. No sulfur was detected by X-ray emission line analysis in the sample obtained using the method of this example.

Example 7

In this example 0.64 g of copper sulfate pentahydrate, 0.11 g of potassium hydroxide, and 15 ml of concentrated ammonia solution are dissolved in 950 ml of total solution as previously described in other examples. The solution is then transferred to the column and nitrogen gas is bubbled, via an inner glass tube, through the solution until the blue color of the copper-ammonia complex is no longer visible. Then more copper-alkali-ammonia solution is added, and the process is repeated. The inner glass tube which conducted the gas is then removed and sectioned to obtain thickness measurements as a function of depth. Average thicknesses (based on two determinations) are measured at various distances from the bottom of the inner tube, by obtaining cross sections of the inner tube. Results of measurements for plating obtained using the method of this example are as follows:

| Distance From the Bottom (Centimeters) | CuO Thickness (Inch) |
| --- | --- |
| 6 | $12.1 \times 10^{-4}$ |
| 13 | $12.9 \times 10^{-4}$ |
| 18 | $14.0 \times 10^{-4}$ |
| 23 | $9.2 \times 10^{-4}$ |
| 28 | $15.4 \times 10^{-4}$ |
| 33 | $14.3 \times 10^{-4}$ |
| 38 | $14.6 \times 10^{-4}$ |
| 43 | $10.5 \times 10^{-4}$ |

These measurements give an indication of the uniformity of thickness of the deposited copper oxide as a function of the distance from the bottom of the inner glass tube.

Example 8

In this example, deposition of zinc oxide or zinc hydroxide is achieved using a solution containing 0.8 g of zinc nitrate hexahydrate, 0.33 g of KOH (3 pellets of commercial potassium hydroxide), and 102 ml of concentrated ammonia.

Using the method of this example, a white deposit was generated on a test slide. Because both zinc oxide ant zinc hydroxide are white compounds, it was surmised without further analysis that either zinc oxide or zinc hydroxide was successfully deposited from the ammonia solution. The thickness of the deposit was about $11.7 \times 10^{-4}$ inch.

Example 9

In this example, deposition of nickel oxide or nickel hydroxide is achieved by a procedure similar to that of Example 8. The solution used contains 1 g of nickel chloride, 1 pellet of KOH (about 0.11 g) and 100 ml of concentrated ammonia solution.

Using this technique, a greenish deposit was generated on the test slide in the column. Because nickel hydroxide and nickel oxide are both green compounds, it was surmised without further analysis that successful deposition of either of those compounds was achieved. The thickness of tube deposit was about $11.2 \times 10^{-4}$ inch.

Example 10

In this example a mixture of 0.64 g of copper sulfate pentahydrate, 0.11 g of potassium hydroxide (1 pellet of the commercial, reagent form of KOH), and 15 ml of ammonia are placed in the previously described glass column. Nitrogen gas is bubbled through the solution until the blue solution is clear with a black deposit having formed on two specimen plates suspended in the column. The liquid is then drained from the column and fresh copper sulfate-potassium hydroxide-ammonia solution, prepared as described, is added to the column. Nitrogen gas flow is started and continued until the color of the soluble copper-ammonia complex is exhausted. This procedure is then repeated three more times, so that the specimen glass plates have been subjected to five successive deposition operations.

Analysis of the deposit of copper oxide which was generated on the plates using the method of this example indicated that its average thickness was $7 \times 10^{-4}$ inch with a range of thicknesses on the plate of 4.3 to $10.0 \times 10^{-4}$ inch.

Example 11

This example demonstrates that a precipitate of copper hydroxide forms momentarily when concentrated ammonia is added to a solution of copper sulfate in water. This indicates that deposition with copper hydroxide or copper oxide can be accomplished using the hydroxide ions from ammonia water alone (i.e., deposition without added hydroxide from potassium hydroxide or other metal hydroxide). About 0.64 g of copper sulfate pentahydrate is dissolved in about 950 ml of water containing 15 ml of concentrated ammonia solution. Nitrogen gas is bubbled through the solution, as in previously described examples. After about three days of bubbling, the originally blue solution becomes nearly colorless and a faint black deposit forms on the inside of the tube and on the test slides suspended therein.

Results obtained using the method of this example showed that the black coating was faint and was a meager deposit compared with the deposit formed in the presence of potassium hydroxide. This shows that the method of present invention works with ammonia solution alone, although the deposit of copper oxide formed is very thin as compared to the process as executed in the presence of potassium hydroxide.

Example 12

In this example, ammonia is removed from solution by heating the solution. Solutions containing 0.64 g of copper sulfate pentahydrate, 0.11 g of potassium hydroxide, and 15 ml of concentrated ammonia solution and a total volume of 300 ml are stirred in a glass beaker. When heated to and maintained at about 80 degrees Celsius, these solutions precipitate black copper oxide. The oxide is deposited primarily as a plate on the thermometer in the solution as well as on the walls of the beaker. The deposit usually forms within about an hour, and some of the copper oxide appears as a precipitate in the solution. At lower temperatures the same deposition phenomenon occurs, although at a slower rate, and with less oxide appearing as a precipitate in the solution. Although plating occurs throughout the container, it seems to occur preferentially near the source of the heat. In the case of a beaker heated from below, the preferential location of deposition is the bottom of the beaker. The same deposition phenomenon is observed in copper-ammonia solutions not contained in the potassium hydroxide, as described in Example 11 above.

Example 13

In this example solutions are analyzed from which copper has been removed in several deposition experiments. In a typical run the starting solution contains 171.4 micrograms of copper per ml.

In the results of seven typical runs using this technique, analyses indicated that 87%, 92%, 93%, 98%, 98%, 91%, and 99% of the available copper was removed as copper oxide. Thus, most of the copper is deposited as copper oxide. Of course, deposits occurred throughout the inside of the tube, not just on the specimen plates used for thickness determinations.

As the above examples illustrate, satisfactory deposition of metal oxides has been demonstrated using techniques whereby ammonia is removed from ammine complexes containing metal ions. Substrates onto which metal oxides are deposited are chemically inert with respect to the deposition reactions, and the high surface area substrates appear to receive deposits preferentially.

From the foregoing description, one skilled in the art can ascertain the essential characteristics of the invention described in this specification and the appended claims, and without departing from the spirit and scope thereof, can make various changes and modifications of the invention to adapt to various usages and conditions.

What is claimed is:

1. A method of deposition metal oxides or hydroxides on a substrate comprising the steps of:
   providing metal ions which, in the presence of aqueous ammonia, form ammine complexes, and which can also form water-insoluble species;
   providing a precipitant for said metal ions;
   providing aqueous ammonia;
   providing a substrate onto which metal ions are to be deposited;

mixing said metal ions with said aqueous ammonia, in an aqueous reaction environment, thereby forming ammine complexes;

slowly decomposing said ammine complexes at a rate sufficient to effect slow release of said metal ions into solution where they react with said precipitant and form metal oxides or hydroxides which then adhere to said substrate as opposed to occurring as a suspension of solids.

2. The method of claim 1, wherein said metal ions are selected from the group consisting of copper, silver, nickel, ruthenium, rhodium, palladium, zinc, cadmium, platinum, iridium, and mixtures thereof.

3. The method of claim 1 wherein said precipitant is an hydroxide.

4. The method of claim 1 wherein said substrate comprises glass.

5. The method of claim 1 wherein said substrate is roughened to increase its surface area.

6. The method of claim 5, wherein said roughening is achieved by using a technique selected from the group consisting of sandblasting, scratching, and swabbing with a corrosive material.

7. The method of claim 1 wherein said decomposing is effected by a technique selected from the group consisting of heating, passing a carrier gas which is inert with respect to precipitation reactions of the method through said aqueous reaction environment, decomposing said ammine complexes by chemical means, and any combination thereof.

8. The method of claim 7 wherein said carrier gas is nitrogen.

9. The method of claim 7 wherein the carrier gas is air.

10. The method of claim 7 wherein said decomposing of said ammine complexes by chemical means is accomplished by using a technique selected from the group consisting of reaction of ammonia with formaldehyde to form hexamethylenetetrammine, and reaction with an ancillary metal ion introduced to remove the ammonia molecules from the metal ion to be deposited.

11. The method of claim 1 wherein said precipitate is metal hydroxide, and further comprising the step of converting said metal hydroxide to metal oxide.

12. The method of claim 11 wherein said converting step occurs spontaneously.

13. The method of claim 12 wherein said metal hydroxide is copper hydroxide and said metal oxide is copper oxide.

14. The method of claim 1 further comprising the step of removing any retained water molecules from sand metal oxides or hydroxides using a technique selected from the group consisting of desiccation in air, desiccation in a vacuum, chemical desiccation in air, chemical desiccation in inert gas, application of heat, and a combination thereof.

15. The method of claim 1 further comprising the step of repeating said metal ion providing step, said mixing step and said reacting step, at least once, so as to achieve sequential deposits on the same substrate.

16. The method of claim 15 wherein at least two of said sequential deposits contain different species of metal ions.

17. The method of claim 1 wherein said precipitant is the hydroxide ions naturally present in said aqueous ammonia.

18. A method of depositing metal oxides or hydroxides on a substrate comprising the steps of:

forming in an aqueous environment ammine complexes containing metal ions; and in the presence of a substrate and a precipitant for said metal ions, destroying said ammine complexes using gas capable of removing ammonia from said ammine complexes, thus releasing said metal ions to react with said precipitant at a rate sufficient to form metal oxides or hydroxides with then deposit on said substrate as opposed to forming a suspension of solids.

* * * * *